INVENTORS.
PATRICK L. MURPHY.
EARL L. BROWN.
BY James E Schardt
ATTORNEY.

INVENTORS.
PATRICK L. MURPHY.
EARL L. BROWN.
BY James E Schardt
ATTORNEY.

United States Patent Office 3,520,145
Patented July 14, 1970

3,520,145
ABSORPTION REFRIGERATION MACHINE
Patrick L. Murphy, Indianapolis, and Earl L. Brown, Brownsburg, Ind., assignors to Carrier Corporation, Syracuse, N.Y., a corporation of Delaware
Filed June 7, 1968, Ser. No. 735,362
Int. Cl. F25b 15/00
U.S. Cl. 62—101                               4 Claims

ABSTRACT OF THE DISCLOSURE

An air-cooled absorption refrigeration machine utilizing a pressurized burner for heating the machine generator. The velocity pressure of air discharged from the condenser-absorber fan in a radial direction is converted to static pressure to provide air to the burner at a higher pressure than the remainder of the air discharged from the fan.

BACKGROUND OF THE INVENTION

In an air-cooled absorption refrigeration machine, ambient air is directed across the condenser and absorber in heat exchange relation with medium therein to absorb heat from the medium. The air, after it has passed through the absorber and condenser, may then pass over other machine components before being discharged from the machine casing. If the generator is located in the air flow path downstream from the condenser and absorber, pressure in the casing surrounding the generator may be higher than atmospheric air pressure and may vary substantially in accordance with wind conditions.

Since air cooled absorption refrigeration machines are ordinarily installed outside the building to be cooled, the machine is subjected to varying atmospheric conditions. The direction and velocity of winds therefore affect the quantity of air passed through the machine by the cooling fan. This also has an effect on the pressure existing within the machine casing surrounding the generator burner.

If the generator flue gas passage were to be vented to the atmosphere and the burner subjected to casing pressure, a pressure differential would exist across the generator which would assure proper combustion and removal of the products of combustion from the generator if the unit were not subjected to winds. However, even under these conditions, the flue gas discharged from the machine and possibly the area of the machine casing surrounding the flue gas vent may be so hot as to cause injury to anyone inadvertently contacting this portion of the machine.

To alleviate the problem of discharging hot flue gases directly to the atmosphere the flue gas can be discharged within the casing in the flow path of air from the absorber and condenser. In this way, the flue gas is cooled by contact with the air flowing through the casing before it is discharged therefrom. However, if the generator burner and flue gas discharge are both located within the casing, the pressure existing at the burner may be substantially the same as that at the flue gas discharge or may even be less resulting in unsatisfactory combustion and flue gas flow through the generator.

SUMMARY OF THE INVENTION

This invention relates to a method and apparatus for providing a positive pressure differential across the generator in an air cooled absorption refrigeration machine to assure proper operation of the generator burner. The velocity energy of the air leaving the absorber-condenser fan in a radial direction is employed to produce an air pressure higher than that existing in the machine casing. The high pressure air is utilized as primary and secondary air for the burner to assure proper combustion and removal of the products of combustion from the machine.

DESCRIPTION OF THE PREFERRED EMBODIMENT

Figure 1:
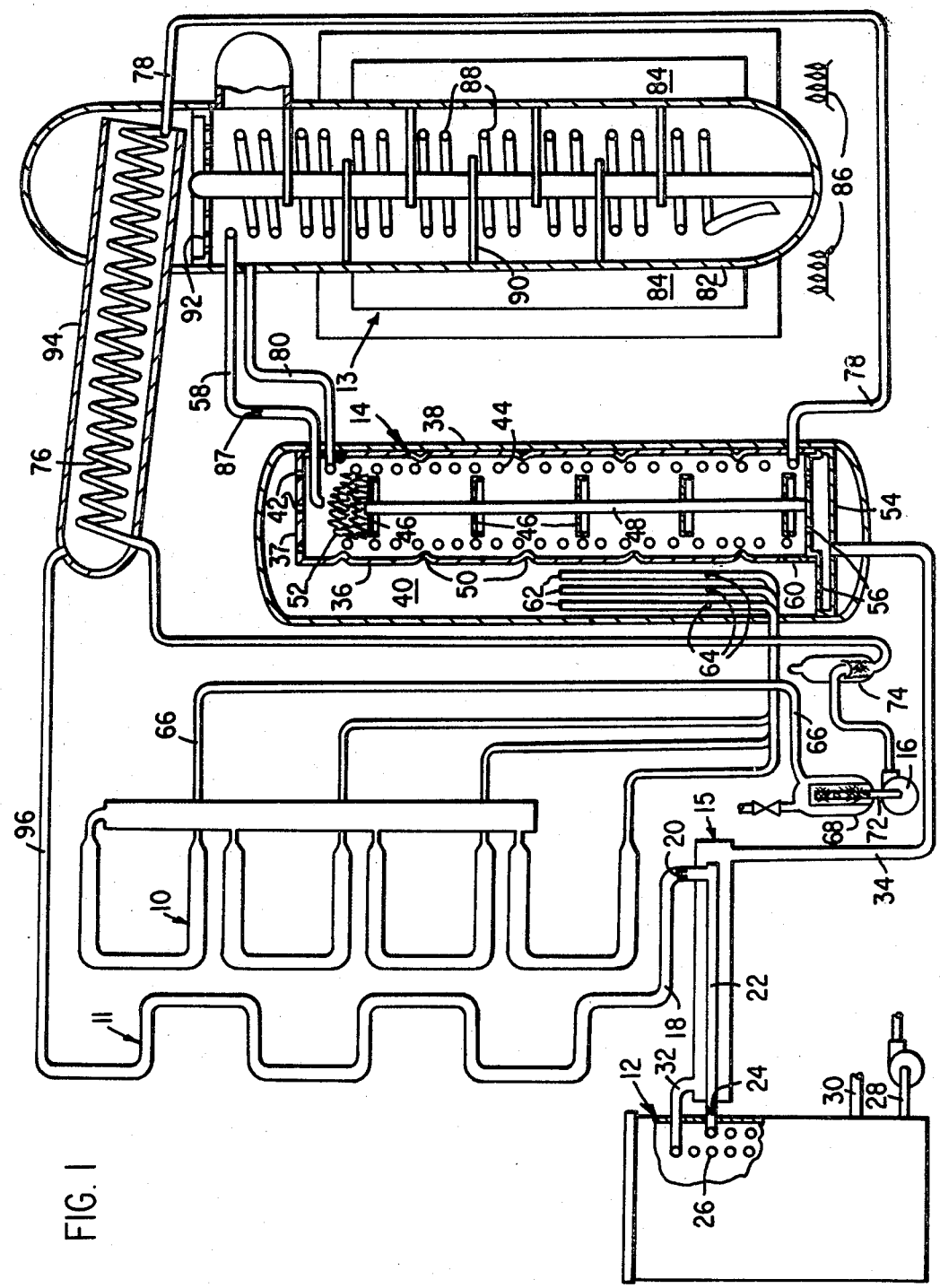
FIG. 1 is a schematic flow diagram of an absorption refrigeration system employing the present invention.

Referring to FIG. 1 of the drawing, there is shown a refrigeration system comprising a primary absorber 10, a condenser 11, an evaporator or chiller 12, a generator 13, a solution-cooled absorber 14 and a liquid-suction heat exchanger 15 connected to provide refrigeration. A pump 16 is employed to circulate weak absorbent solution from primary absorber 10 to generator 13. As used herein the term "weak absorbent solution" refers to a solution which is weak in absorbent power and the term "strong absorbent solution" refers to a solution which is strong in absorbent power. A suitable absorbent solution for use in the system described is water and a suitable refrigerant is ammonia.

Liquid refrigerant condensed in condenser 11 passes through refrigerant liquid passage 18, and refrigerant restriction 20 to heat exchange tube 22 of liquid-suction heat exchanger 15. The liquid refrigerant is cooled in tube 22 and emerges from the liquid-suction heat exchanger and passes through refrigerant restriction 24 into heat exchanger 26 in chiller 12.

A fluid medium such as water to be chilled passes over the exterior of heat exchanger 26 where it is chilled by giving up heat to evaporate refrigerant within the heat exchanger. The chilled medium passes out of the chiller 12 through line 28 to suitable remote heat exchangers (not shown) after which it is returned to the chiller through inlet 30 for rechilling.

The cold refrigerant evaporated in heat exchanger 26 passes through refrigerant vapor passage 32 and through liquid-suction heat exchanger 15 in heat exchanger relation with liquid refrigerant passing through tube 22. The refrigerant vapor then passes through refrigerant vapor passage 34 into solution-cooled absorber 14.

The solution-cooled absorber 14 is formed within a tubular or cylindrical vessel 38 by a tubular, preferably, cylindrical internal baffle 36 which divides the tubular cylindrical vessel 38 into the solution-cooled absorber 14 and a second solution chamber 40. Vessel 38 is preferably closed at both ends. Baffle 36 may be provided with a top cover plate 37 having a plurality of vapor discharge apertures 42 therein to allow vapor to escape from solution-cooled absorber 14 into chamber 40.

A weak solution heat exchanger 44, preferably comprising a helical coil is disposed within solution-cooled absorber 14. A plurality of horizontal plates 46 are secured to a central support 48 and arranged within baffle 36 to cooperate with annular grooves 50 and heat exchanger 44 to provide a tortuous path for passage of vapor and solution through solution-cooled absorber 14. Suitable packing such as Raschig rings 52 may fill the space between the uppermost plate 46 and the top of the solution-cooled absorber to reduce the tendency for solution froth to escape through discharge apertures 42.

A refrigerant vapor distributor header 54 is secured to close the bottom of baffle 36. Header 54 is provided with refrigerant vapor ports 56 for passage of refrigerant vapor from line 34 into solution-cooled absorber 14 and chamber 40. Strong solution from generator 13 is supplied to the top portion of solution-cooled absorber 14 through line 58. The strong solution passes downwardly through the solution-cooled absorber in counterflow relation to upwardly passing refrigerant vapor and weak solution passing through coil 44. A strong solution discharge passage 60 is provided adjacent the lower portion of baffle 36 for passage of solution from the solution-cooled absorber into chamber 40.

Solution discharge passages 62 are provided for passing a mixture of refrigerant vapor and solution from chamber 40 to primary absorber 10. Each of the discharge passages comprises a tubular member having an upper open end for admission of vapor and a solution inlet aperture 64 which is disposed below the level of absorbent solution in chamber 40. This insures a mixed flow of liquid and vapor to the primary absorber.

A cooling medium, preferably ambient air, is passed through the primary absorber 10 in heat exchange relation with the absorbent solution to cool the absorbent solution to promote the absorption of the refrigerant vapor in the absorber. The same cooling medium may be supplied to condenser 11 in heat exchange relation with refrigerant therein to condense the refrigerant.

Cold weak absorbent solution passes from primary absorber 10 through line 66 into pump inlet tank 68. Weak solution from inlet tank 68 is supplied to weak solution pump 16 through line 72. Liquid from pump 16 passes through pump discharge tank 74 to a rectifier heat exchange coil 76. From coil 76, the weak solution passes through line 78 to weak solution heat exchanger 44 in solution-cooled absorber 14. The weak solution from coil 44 passes through line 80 into the upper portion of generator 13 along with any vapor formed in coil 44.

Generaor 13 comprises a shell 82 having fins 84 suitably affixed thereto as by welding. The generator is heated by a gas burner 86 or other suitable heating means. The weak solution is boiled in generator 13 to concentrate the solution, thereby forming a strong solution and refrigerant vapor.

The hot strong absorbent solution passes upwardly through the analyzer section of generator 13 through analyzer coil 88 in heat exchange with weak solution passing downwardly over the coil. The warm strong solution then passes through line 58 which has solution restrictor 87 therein and is discharged into the upper portion of solution-cooled absorber 14.

Refrigerant vapor formed in generator 13 passes upwardly through the analyzer section thereof where it is concentrated by mass heat transfer with weak solution passing downwardly over analyzer coil 88. Analyzer plates 90 in generator 13 provide a tortuous path for flow of solution and vapor to assure intimate contact therebetween to improve the mass heat transfer. The refrigerant vapor from the analyzer section passes through reflux plate 92 in heat exchange relation with absorbent condensed in rectifier 94. The vapor then passes through rectifier 94 in heat exchange relation with rectifier heat exchange coil 76. Absorbent condensed in rectifier 94 flows downwardly onto plate 92 where it is headed by the refrigerant vapor passing therethrough. The heated absorbent is then passed to the generator along with the weak solution discharged into the generator from line 80. Refrigerant vapor passes from rectifier 94 through line 96 to condenser 11 to complete the refrigeration cycle.

Figure 2:
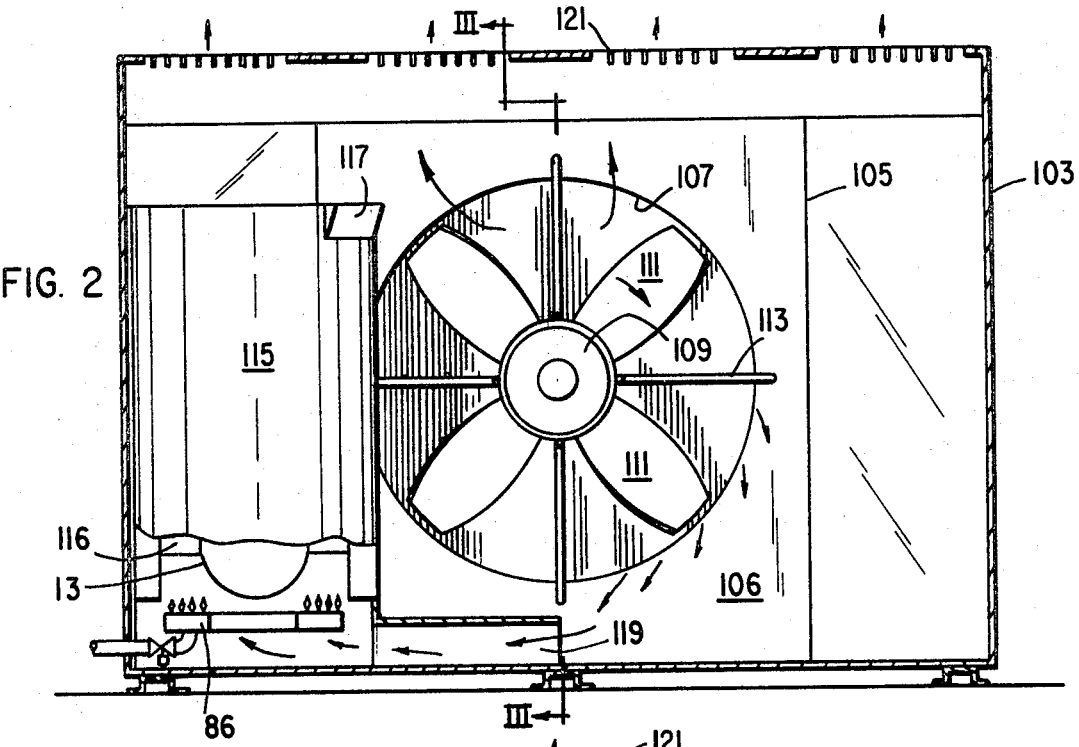
FIG. 2 is an elevational view of a portion of the absorption refrigeration machine.
Figure 3:
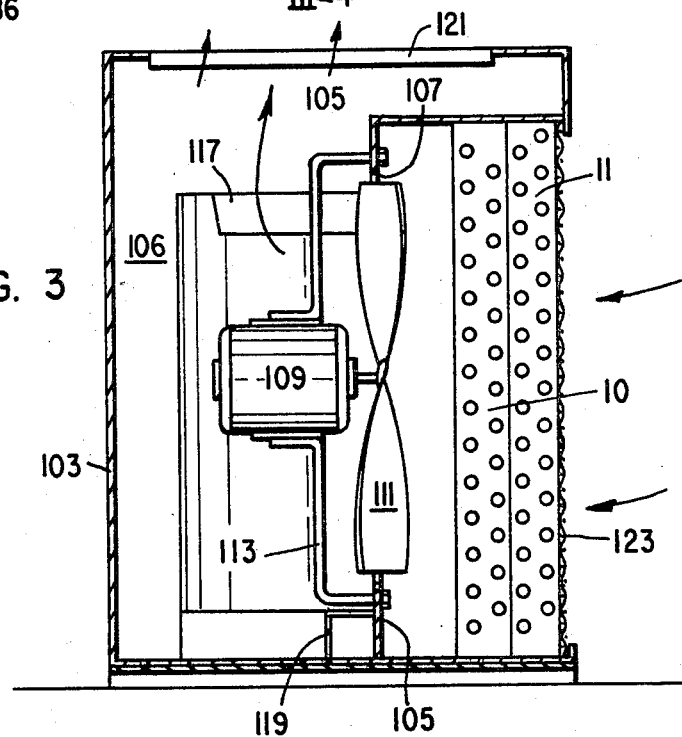
FIG. 3 is a sectional view taken along line III—III of FIG. 2.

Referring to FIGS. 2 and 3 there is illustrated an absorption refrigeration machine including a casing 103 having condenser 11 and absorber 10 therein. A casing partition 105 having a fan orifice 107 therein separates the condenser and absorber from section 106 of the casing interior. A fan having a motor 109 and fan blades 111 is suitably supported on partition 105 as by supports 113 to position fan blade 111 within orifice 107. The fan blades extend beyond the front and back surfaces of partition 105. A suitable position for the blades would result in the greatest proportion of the blade projecting from the inlet side of the orifice. Generator 13, having an outer shield 115 associated therewith to form a flue gas passage 116 therebetween is disposed within casing 103. Outer shield 115 has an opening 117 therein for passage of flue gas from passage 116. Burner 86 is provided to heat the absorbent solution in the generator.

A combustion air supply duct 119 is provided within casing 103 to pick up air discharged in a radial direction from the portion of the fan blades which project beyond orifice 107. The velocity pressure of the air discharged from the tips of the fan blades in a radial direction is relatively constant, irrespective of the varying pressure existing in the casing on the discharge side of the fan. As can be seen from the arrows which designate air flow direction, air passes through the condenser, absorber and orifice 107 into section 106 of the casing. The air then passes out air discharge grilles 121 formed in the top of casing 103. It can be seen from the foregoing that the section 106 of the casing containing generator 13 is pressurized by the fan. This pressure, however, is variable due to wind conditions, partial blocking of the casing inlet or discharge openings by debris, etc. As such, the air pressure at burner 86 would ordinarily vary over a wide range and could result in a burner pressure substantially the same as the pressure at flue gas outlet 117. Under these circumstances, proper combusttion of fuel in burner 86 would be difficult if not impossible to obtain. However, by providing duct 119, the relatively constant velocity pressure of the air leaving fan blades 111 in a radial direction can be utilized to create a substantially constant static pressure in duct 119 and around burner 86 which is greater than the pressure within casing 103 under all normal operating conditions to assure a positive pressure differential between burner 86 and flue outlet 117.

The air flow characteristics of a propeller type fan as illustrated, therefore, results in an air flow pattern which can be utilized to provide combustion air to the burner at a substantially constant pressure irrespective of the resistance to air flow through the casing created by varying wind conditions or any debris that might collect on the inlet screen 123 in front of the coils. The flue gas discharged from opening 117 mixes with the air passing through casing 103 so that the air discharge from grille 121 is cool enough to prevent injury to anyone inadvertently coming in contact with discharge grilles 121 or the air discharge therefrom.

While we have described a preferred embodiment of our invention, it is to be understood the invention is not limited thereto since it may be otherwise embodied within the scope of the following claims.

We claim:

1. A method for supplying combustion air to the burner of a direct fired absorption refrigeration machine including the steps of:

utilizing a propeller fan to pass air through the condenser and absorber of the absorption machine, discharging the air after its passage through the condenser and absorber in an axial direction within the machine casing, air so discharged creating a varying static pressure in the casing in accordance with varying pressure conditions at the outlet of the casing, collecting at least a portion of the air radially discharged from the tips of the fan blades while converting velocity pressure of said air to static pressure greater than static pressure of air within the casing, and utilizing the collected air to supply primary and secondary combustion air to the burner.

2. A method for supplying combustion air to the burner of a direct fired absorption refrigeration machine according to claim 1 including the steps of:

mixing a portion of the air axially discharged by the fan with the collected portion of the air radially discharged from the tips of the fan blades, thus providing a supply of air at a substantially constant static pressure, and utilizing the mixture of air to supply primary and secondary combustion air to the burner.

3. A direct fired absorption refrigeration machine comprising a generator, an absorber, a chiller and a condenser connected to provide refrigeration, a casing, a partition disposed in said casing having a fan orifice disposed therein, said condenser and absorber being disposed on one side of said partition, said generator being disposed on the other side of said partition, propeller type fan means disposed in the fan orifice of said partition, for drawing ambient air through said absorber and said condenser, said fan means being adapted to discharge the air drawn through the condenser and absorber into the casing on the generator side of said partition in an axial and radial direction, duct means on the generator side of said partition for collecting a portion of the air radially discharged from the tips of said fan means to convert the velocity pressure of the radially discharged air into static pressure higher than that created in the casing by the axially discharged air, and burner means associaed with said generator for heating the solution therein, said duct means communicating with said burner for providing high static pressure air to said burner for combustion therein.

4. An absorption refrigeration machine according to claim 3 including a discharge grille formed in said casing on the generator side of said partition, a shield enclosing said generator for passage of flue gas therebetwen, said shield having an opening therein within said casing for passage of flue gas into the air passing through the casing.

References Cited

UNITED STATES PATENTS

| | | | |
|---|---|---|---|
| 3,296,814 | 1/1967 | Lynch et al. | 62—476 X |
| 3,407,625 | 10/1968 | McDonald | 62—148 X |

LLOYD L. KING, Primary Examiner

U.S. Cl. X.R.

62—148, 476